2,916,440

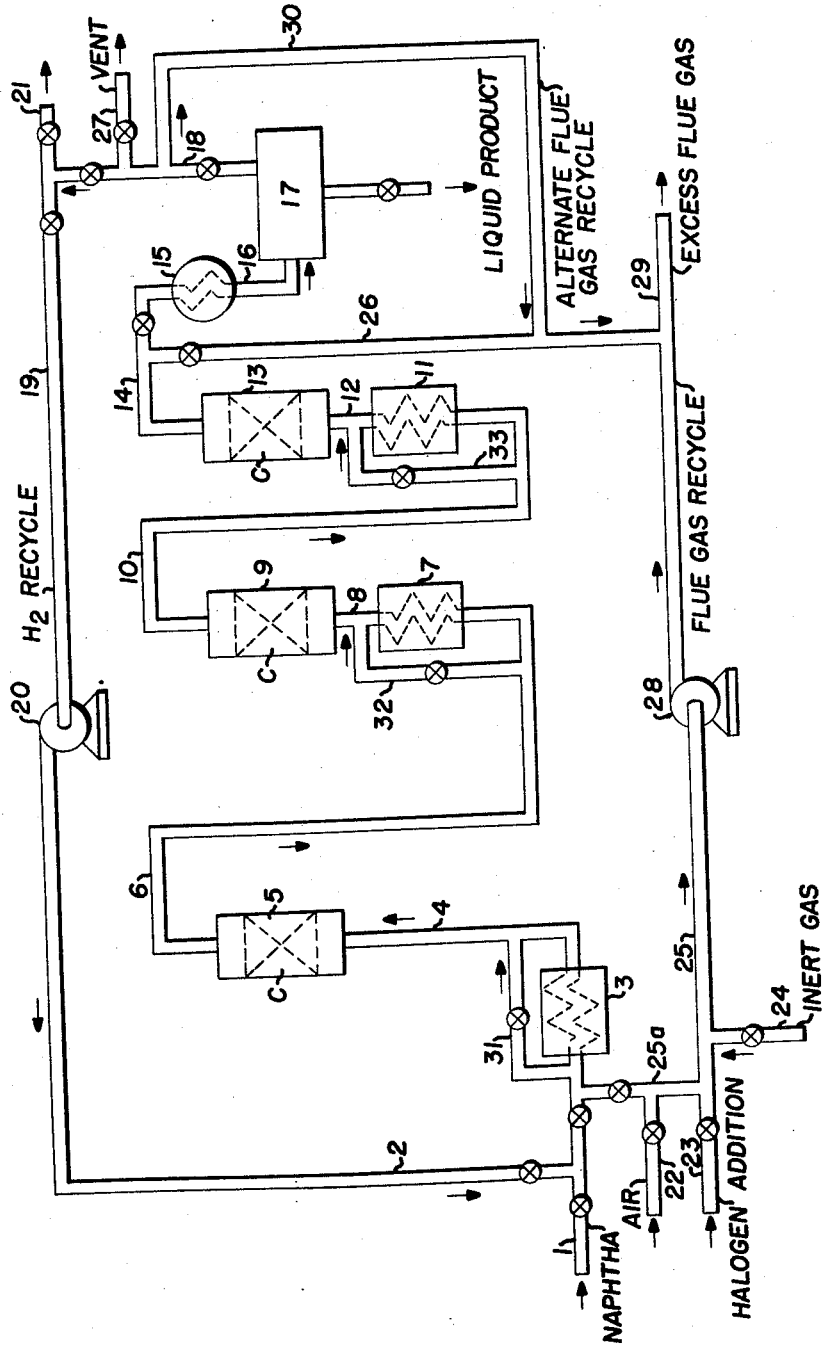

HYDROFORMING OF A NAPHTHA WITH A PLATINUM-ALUMINA-HALOGEN CATALYST AND THE REGENERATION OF THE CATALYST WITH AN OXYGEN- AND HALOGEN-CONTAINING GAS

David R. Hogin, Cranford, Robert C. Morbeck, Fanwood, and Hiram R. Sanders, Jr., Linden, N.J., assignors to Esso Research and Engineering Company, a corporation of Delaware Application June 27, 1955, Serial No. 518,198

9 Claims. (Cl. 208—140)

The present invention relates to improvements in hydroforming. More particularly, the present invention relates to improvements in hydroforming employing a platinum group metal catalyst and has particular reference to maintaining the halogen content of the catalyst within limits which will maintain the catalyst at a very high activity level.

The hydroforming of naphthas whether they be virgin naphthas, cracked naphthas, Fischer naphthas, or a mixture of these is now a matter of record and to a limited extent, commercial practice. The oil companies and others are now engaged in an extensive research and development program, seeking to increase the anti-detonation quality of motor fuel by hydroforming so as to meet the requirements of the modern high compression motors.

The literature contains a long list of catalysts which may be used in hydroforming. At the present time it appears that the best catalysts are either a platinum group metal or VI group metal oxides, such as molybdenum oxide. The hydroforming catalyst, in the case where the hydrogenation-dehydrogenation component is platinum, consists of a refractory oxide of high adsorptive power, such as an active form of alumina supporting a small amount of platinum and also including in its composition a small amount of halogen such as chlorine. Platinum is an excellent hydrogenation-dehydrogenation catalyst, but it is not as effective a hydrocracking catalyst as molybdenum oxide. It is not only necessary in hydroforming a naphtha to dehydrogenate the naphthenes therein contained, but it is also necessary and desirable that a certain amount of isomerization of paraffins take place and in the interest of good volatility characteristics, it is necessary that there be some hydrocracking of the high molecular weight paraffins contained in the naphtha. The inclusion of a halogen, such as chlorine in the platinum catalyst composition improves its hydrocracking activity and also its isomerizing activity.

There are many proposals in the technical and patent literature with respect to the preparation of good platinum-containing catalysts. In the preparation of platinum-containing hydroforming catalysts, it is conventional to employ a platinum compound which is soluble in water and which contains chlorine. Thus, chloroplatinic acid dissolved in water is commonly used to impregnate an alumina carrier. A good way to prepare such a catalyst is to impregnate an alumina which is 100% in the eta form with the above water soluble platinum compound and thereafter dry and heat activate the material. A good way to prepare the eta alumina is to react an alcohol with metallic aluminum in the presence of a small amount of mercury, hydrolyze the resulting alcoholate, dry and heat activate the composition, a procedure which is known in the prior art. However, during the hydroforming operation, the chlorine content of the catalyst is reduced by the conditions of normal operation. This is particularly true where the platinum catalyst is used in the so-called regenerative type of operation wherein periodically, the catalyst is treated with an oxygen-containing gas to burn off carbonaceous and other deposits on the catalyst which impair its activity. While it is true that most virgin naphthas contain small quantities of chlorine, and that this chlorine in the feed tends to replace the chlorine lost by volatilization and for other reasons during the normal hydroforming operation, it is not desirable to depend solely on this method of chlorine replacement, particularly, where the catalyst is subjected to periodic regenerations.

In order to obtain high catalyst activity with platinum on an active alumina-containing hydroforming catalyst, the catalyst chloride content must be maintained above 1.0 to 1.5 wt. percent as compared to about 0.6 wt. percent for a normal fresh catalyst. Activity increases some four-fold as the catalyst chloride content varies from 0.1 to 1.5 wt. percent. It has been found that catalysts lose their chloride content very rapidly during regeneration due to the presence of $H_2O$. This effect is so marked that a normal regeneration with flue gas recirculation would quickly strip off chlorine and thus the catalyst would become considerably less active after only a few regenerations unless chlorine is added back to the system.

This invention provides an improved process for keeping the chloride on the catalyst during regeneration and a method for accurately controlling the chloride content of the catalyst at the end of regeneration.

It has been found that chlorine can be maintained on the catalyst by adding HCl to the regeneration gases. Moreover, the controlling factor has been found to be the mol ratio of $HCl/H_2O$ entering or in the reactor during catalyst oxidative regeneration. The higher this ratio, the higher the equilibrium chloride content of the catalyst. For example, with atmospheric pressure oxidative regeneration at $HCl/H_2O$ ratios in the range of 0.1, the chloride content will be less than 0.3 wt. percent. At extremely low values all of the chloride will be stripped off from the catalyst. However, if the $HCl/H_2O$ ratio is maintained at 0.7 or above, the equilibrium value will be above 1 wt. percent on catalyst. Even higher catalyst chloride contents can be maintained on the catalyst at higher $HCl/H_2O$ ratios—2.0 to 2.5 wt. percent being about the maximum value. Thus, by accurately controlling the $HCl/H_2O$ ratio during regeneration the catalyst chloride content can be maintained at any desired level. At higher pressures the equilibrium favors retaining chloride on the catalyst. At 100 p.s.i.g., an $HCl/H_2O$ ratio of about two-thirds that at atmospheric pressure is required.

During regeneration with recirculating flue gas, the HCl (or other suitable volatile halide) is added to the inlet air stream at rate dependent upon the concentration of $H_2O$ in the recirculating flue gas. Since the flue gas is recirculated at a high rate, say, 25 s.c.f. of flue gas per s.c.f. of air, the HCl content of the flue gas will be essentially the same as in the incoming air.

The object of the present invention is to maintain the hydroforming of naphthas using a platinum group metal catalyst at a high level of activity.

A specific object of the present invention is to so operate a platinum catalyst-using hydroforming operation wherein the catalyst is periodically regenerated so as to maintain the catalyst at a high level of activity without requiring the addition of halogen to the catalyst during the on-stream period.

A still further object of the present invention is to provide means for maintaining a platinum-containing hydroforming catalyst at a high level of activity in a process wherein the catalyst is periodically regenerated with regeneration gas containing water.

In the accompanying drawing there is set forth, diagrammatically, the essential components of a hydroforming plant in which the present improvements may be carried into effect.

Referring in detail to the drawing, 1 represents a valved naphtha feed line. 2 represents a line in which recycle gas, that is to say, a gas rich in hydrogen flows into the oil stream in line 1 and this mixture is charged to a furnace 3 wherein it is heated to hydroforming reaction temperatures, thence withdrawn through line 4 and charged to a lead reactor 5 containing a fixed bed C of a platinum-containing catalyst. The mixture of oil vapors and hydrogen undergo hydroforming and the product is withdrawn from reactor 5 through line 6, reheated in a second furnace 7 and thereafter charged via line 8 to a second reactor 9 also containing a fixed bed C of platinum-containing catalyst. In reactor 9 further conversion occurs and the product is withdrawn through line 10 and charged to a third furnace 11 wherein it is reheated, thereafter withdrawn through line 12 and charged to a tail reactor 13 also containing a fixed bed C of platinum-containing catalyst. The reaction is substantially completed in reactor 13 and the product is withdrawn through line 14, thence cooled in 15 to a temperature of about 100° F. The cooled product is withdrawn from 15 via line 16 and charged to a separation drum 17. The recycle gas is recovered overhead from 17 through line 18, thence passed via line 19 to compressor 20 and thence passed via line 2 to line 1 for further use in the process. Excess hydrogen-containing gas is rejected from the present system through line 21. The unstabilized hydroformate is withdrawn from drum 17 for delivery to distillation to form a desired fraction for product.

It will be noted that in the above-described diagrammatic showing the flow of reactants is upwardly in the several reactors. It will be understood that the flow of these reactants may be in a downwardly direction whence, of course, the piping and valve means shown would have to be modified in known manner to achieve this latter type of flow.

There comes a time when it is necessary to regenerate the catalyst. At this time the flow of oil and recycle gas through the system is discontinued. This may be accomplished by closing the valves in lines 1 and 2, respectively. Before introducing a regeneration gas into the system, the catalyst in the reactors are purged with an inert gas which may be, say, cylinder nitrogen, the fumes resulting from a previous regeneration withdrawn from a storage tank (not shown) or any inert gasiform material. This purging gas passes from valved line 24 into line 25, thence via line 25a into line 1 for circulation through the reactors 5, 9 and 13 in series as well as through the furnaces 3, 7 and 11. The purpose of the purging step, of course, is to remove volatile hydrocarbons which are adsorbed or occluded by the catalyst in the several beds. The fumes resulting from the purging operation are caused to flow from the tail reactor 13 through the product recovery system (cooler 15, separator 17) and then toward valved line 27 where they may be rejected from the system.

Following the purging operation air in valved line 22 is charged to line 25a wherein it is mixed with flue gas from line 24 to the extent that at the beginning of the regeneration operation the concentration of oxygen in the regeneration gas is low, say, 1–2 mol percent. Simultaneously, a halogen-containing material such as HCl is charged via valved line 23 to line 25a. The regeneration gas entering the lead reactor 5 contains the desired amount of halogen proportioned as previously stated with the amount of water also contained in the regeneration gas. The regeneration gas flows through the reactors 5, 9 and 13 under conditions more fully set forth hereinafter and the oxygen contained in said gas causes combustion and gasification of the carbonaceous and other deposits on the catalyst. This regeneration gas can also pass through the furnaces 3, 7 and 11. The burning of fuel in 7 and 11 to add heat may be discontinued in the said furnaces 7 and 11 or otherwise adjusted to maintain the desired temperatures in the said reactors 5, 9 and 13. It might often be preferable to by-pass the furnaces during regeneration. Lines 31, 32 and 33 are used for this purpose. The regeneration fumes emerge from tail reactor 13 and pass via line 14 into line 26 by closing the valve in line 14. The hot fumes are forced via line 26 through blower 28 operating at high temperature, and thence passed via valved lines 25 and 25a into line 4 for recycling through the reactor in the manner previously indicated with air from line 22. The flue gas make is vented from the system via line 29. An alternate route for the flue gas leaving reactor 13 is to cool it in cooler 15, separate out some of the water in 17 and then recirculate the said gas through dotted line 30. This procedure involves cooling and reheating large quantities of gas and is a less preferred embodiment of the invention. As time goes on and the amount of carbonaceous and other deposits on the catalyst is reduced, the oxygen concentration of the regeneration gas in line 4 is increased by decreasing the amount of recycled flue gas until toward the end of the regeneration substantially pure air is forced through the series of reactors. At the conclusion of the regeneration period the catalyst is again purged and this time it is preferable to use a purging gas which is free of the oxides of carbon because experience has shown that these gases may poison the platinum group metal catalysts. Consequently, a gas such as cylinder nitrogen may be used in this purging operation following the discontinuance of the air treatment, which discontinuance is effected by closing the valves in lines 22, 23 and 26, respectively, and the treatment with the nitrogen-containing gas from line 24 is continued until occluded oxygen and the oxides of carbon are expelled from the several reactors. It is pointed out, however, that it may be desirable and necessary following a number of cycles, including on-stream and regeneration periods, to treat the catalyst under system pressure, that is, pressures of 200–400 p.s.i.g. with an oxygen-containing gas for a period of 24 hours or more. The purpose of this treatment is to reduce the average particle size of the hydrogenation-dehydrogenation component of the catalyst, say, the platinum component, which during a series of hydroforming and regeneration phases, usually increases in size to a value greater than, say, up to 150 A. or higher. In this state the catalyst is inactive. It should possess a particle size less than, say, 50 A. In this treatment of the substantially carbon-free catalyst with air or oxygen, the oxygen-containing gas is not circulated through the system, but rather the catalyst is permitted to soak in the said oxygen-containing gas, under conditions such that the oxygen partial pressure is at least 1 atmosphere and the temperature is about 900°–1000° F.

At the conclusion of the regeneration and purging period the hydroforming period is begun by manipulation of the proper valves and in accordance with the previous description. Of course, where the carbon-free catalyst is treated with oxygen to rejuvenate the catalyst, it will be necessary to purge the oxygen from the catalyst in several reactors before going back on-stream.

In order to explain the invention more fully, the following further information is set forth.

EXAMPLE

A naphtha having the following inspection may be treated under the conditions set forth below.

Feed inspection

Boiling range, °F.: Initial B.P. 165° to 250° F.; Final B.P. 300° to 400° F. _____ 200/330
Vol. percent naphthenes _____ 41
Vol. percent aromatics _____ 15
Vol. percent paraffins _____ 44
Octane rating CFRR _____ 58

Conditions during hydroforming

|  | Range | Preferred |
| --- | --- | --- |
| Catalyst composition | 0.1-2% Pt on alumina. | 0.6 wt. percent Pt on 99.4% eta alumina. |
| Inlet Temperature, °F | 850-1,000 [1] | 880-975. |
| Pressure, p.s.i.g. | 50-700 | 200-450. |
| Oil feed rate, W./Hr./W | 0.2-20.0 | 1-5 give good results. |
| S.c.f. of $H_2$-rich gas fed to a hydroforming zone per barrel of feed naphtha. | 1,000-12,000 | 4,000-6,000. |
| Concentration of hydrogen in hydrogen-containing gas. | 50-95 | 80-90. |

[1] The temperatures are dependent on the feed rate, higher feed rates being permissible at the higher temperature levels.

Product inspection

Vol Percent $C_5+$ hydrocarbons
based on feed ------------------------------------- 86.6
Octane rating CFRR ------------------------------- 95

After an on-stream period of, say, 2000 hours, the catalyst loses activity as evidenced by a drop in the octane rating of the product. Of course, the actual length of the on-stream period, before regeneration is required, will depend on the severity of operating conditions. The catalyst is then regenerated first using air diluted to the extent that it contained about 1.0% free oxygen. After a period of 8 hours the oxygen content of the regeneration gas is increased to that of pure air by discontinuing the recycling of flue gas which had been used to dilute the air. In accordance with the present invention HCl is included in the regeneration gas and the amount of such HCl is proportioned responsive to the water content of the said regeneration gas in accordance with the directions set forth below.

Conditions during regeneration

|  | Range | Preferred |
| --- | --- | --- |
| Free oxygen concentration of regeneration gas during initial period, mol percent. | 0.5-4.0 | 1-2. |
| Oxygen concentration of regeneration gas during final period, mol percent. | 5-100 | 21 (undiluted air). |
| Ratio of HCl to $H_2O$ in regeneration gas, in mols. | 0.2-2.0 | 0.3-0.7. |
| Temperature, °F | 700-1,100 | 750-850 (950-1,100 after $O_2$ is increased to maximum concentration). |
| Pressure, p.s.i.g | 0-500 | 200-400. |
| Duration of regeneration period | | 2-24 hours. |

It has been found that treating the catalyst with a halogen-containing regeneration gas, which also contains water, gives improved results and no further halogen or chlorine treatment of the catalyst, such as adding chlorine with the feed is necessary to maintain the catalyst at a very high activity level.

Following the regeneration of the catalyst, the same is stripped with nitrogen, or dried flue gas, to remove the oxides of carbon, then treated with hydrogen and thereafter the oil feed to the hydroforming zone is renewed. It is thus found that the catalyst is substantially restored to its initial activity when tested in the manner hereinbefore set forth.

In order to compare the effect of the present regeneration procedure with the conventional method of regenerating a platinum catalyst, the same regeneration procedure was utilized in treating the spent catalyst except that the inclusion of HCl in the regeneration gas was omitted.

There is set forth below the inspection of the feed treated under the below conditions and regeneration of the catalyst by the applicants' method as compared with conventional methods.

Comparison of halide treat vs. no treat

Feed stock:
  Boiling range, °F. ---------------------- 200-330
  Vol. percent aromatics ---------------------- 11
  Vol. percent paraffins ---------------------- 46
  Vol. percent naphthenes ---------------------- 43
  CFR-Research octane number, clear ---------- 50

[Hydroforming conditions: 200 p.s.i.g., 4 w./hr./w. 5 m.s.c.f./B. recycle hydrogen rate. 900° F. average catalyst temperature.]

|  | Catalyst at Initial Condition | Catalyst after regeneration with wet (10% $H_2O$) flue gas and no halide | Catalyst after regeneration with wet flue gas with halide addition, the mol ratio of HCl to $H_2O$ being 0.7 |
| --- | --- | --- | --- |
| Catalyst chloride content, wt. percent | 1.0 | 0.4 | 1.0 |
| CFR-R Clear O.N. | 95 | 88 | 95 |
| Yields, vol. percent of $C_5+$ hydrocarbons based on feed | 84.5 | 89.5 | 84.5 |

The catalyst regenerated by the conventional method (middle column) is only about 40% as active as the fresh catalyst or the catalyst regenerated in accordance with the present invention as evidenced by the much lower octane number of the product. In order to obtain a 95 O.N. product using the catalyst regenerated by the conventional procedure, it would be necessary to reduce the feed rate to 1.6 w./hr./w., while otherwise employing the same conditions as specified above. If the temperature were increased to 925° F. to obtain a 95 O.N. and using the conventional method of regenerating the catalyst, the rate of carbonaceous deposition would be greatly increased which would require more frequent regeneration and/or shorter catalyst life. It is pointed out that the conventional flue gas obtained from the regeneration contains 8-11 mol percent water since it is usually cooled to about 700° F. before recycling, which means that the water formed during the regeneration and that brought in with the air is retained to an appreciable extent in the flue gas at this relatively high temperature.

In the foregoing example, it will be understood that the specific details therein set forth are merely illustrative and do not impose any limitation on the invention, for the skilled operator will fix the hydroforming conditions responsive to the particular feed oil which he is treating according to conventional practice.

To recapitulate briefly, the present invention relates to improvements in the hydroforming process carried out in the presence of a noble metal catalyst such as platinum or palladium carried on a suitable support such as active alumina, and the gist of the invention resides in the concept of regenerating the catalyst periodically in such a manner as to preserve its halogen content. In accomplishing this result the regeneration gas contains added halogen, such as HCl, $CCl_4$, elemental chlorine, HF, or in fact, any volatile halide or halogen-containing material. The amount of such halogen in the regeneration gas is proportioned responsive to the water content of said regeneration gas, or the water content of the regeneration gas in the reactor. Experience has shown that during regeneration, water tends to strip the halogen from the catalyst and thus its activity is impaired. The present invention, therefore, provides means for preventing the loss of halogen during the regeneration even when the regeneration gas contains water. It is realized that the prior art contains proposals for replenishing chlorine content of the catalyst which is lost during the operation by adding chlorine or other halogen to the feed. The present invention, however, provides means whereby it is not necessary to add further amounts of halogen before or during the hydroforming operation to maintain the catalyst at a desired activity level. In the case where flue gas is recycled during regeneration to dilute the air, and wherein the recycle flue gas is dried, the amount of halogen that need be added to the regeneration gas can, of course, be greatly reduced.

Numerous modifications of the present invention may be made by those who are familiar with the present art.

What is claimed is:

1. In the hydroforming of naphthas in the presence of a catalyst containing a platinum group metal in which a naphtha is contacted with a catalyst in the presence of hydrogen under hydroforming conditions of temperature, pressure and contact time, the improvement which comprises periodically regenerating the catalyst with an oxidative regeneration gas containing a halogen, the amount of which halogen calculated as HCl is from 0.2–2.0 mols of halogen per mol of water in the regeneration gas.

2. The method set forth in claim 1 in which the halogen is chlorine.

3. The method of catalytically hydroforming naphthas in a process in which the hydroforming operation is discontinued in order to regenerate the catalyst, which comprises contacting the said naphtha in the presence of added hydrogen with a catalyst consisting essentially of from about 0.1–2% platinum, 96.5–98.9% alumina and from about 1.0–1.5% halogen calculated as HCl in the hydroforming zone maintained under a pressure of from about 200–450 p.s.i.g., maintaining an inlet temperature of the reaction zone in the range of from about 880°–975° F., permitting the naphtha to remain resident in the reaction zone for a sufficient period of time to effect the desired conversion, discontinuing the naphtha and hydrogen feed to the reaction zone, purging the reaction zone with an inert gas to remove volatile hydrocarbons, treating the purged catalyst with an oxygen-containing gas, which gas also contains water and a halogen, the ratio of halogen, calculated as HCl to water being from about 0.3–0.7, continuing the treatment with the regeneration gas until carbonaceous and other deposits have been substantially combusted and removed from the catalyst, thereafter treating the catalyst with a purging gas substantially free of the oxides of carbon to remove oxygen from the said catalyst and thereafter contacting the regenerated catalyst with feed naphtha and added hydrogen in a renewal of the hydroforming on-stream period.

4. The method set forth in claim 3 in which the catalyst is purged with nitrogen, following the regeneration.

5. The method set forth in claim 3 in which the catalyst following a series of on-stream and regeneration phases thereof during which the platinum catalyst increases in crystalline size, is soaked for an extended period of time at system pressure in an oxygen-containing gas in which the oxygen partial pressure is at least 1 atmosphere, in order to reduce the average particle size of the platinum to a value not exceeding about 50 Å.

6. The method set forth in claim 3 in which during the regeneration phase the fumes resulting from the regeneration are cooled and thereafter recycled to the regeneration step in order to reduce the oxygen concentration of the regeneration gas.

7. In the regeneration of an alumina supported platinum hydroforming catalyst after impairment of its hydroforming activity by carbonaceous and other deposits and wherein the catalyst is contacted with oxidative regeneration gas that effects combustion of said deposits during which water is formed then is contacted with inert purging gas to remove oxygen and gaseous combustion products containing $H_2O$, the improvement of supplying to gas thus contacted with the catalyst a halogen in an amount of 0.2–2.0 mols calculated as HCl per mol of $H_2O$ in the gas.

8. In the regeneration of an activated alumina supported platinum chloride hydroforming catalyst treated with oxygen to burn off deposits which impair its activity and contacted with an inert purging gas for removing oxygen and combustion products including $H_2O$, the improvement of supplying to said gas contacted with the catalyst under regeneration conditions of 700°–1100° F. chlorine in an amount of 0.2–2.0 mols calculated as HCl per mol of $H_2O$ in the gas and controlling the chloride content of the catalyst and improving the hydroforming activity of the catalyst at the end of the regeneration.

9. In the regeneration defined by claim 2, said purging gas being fumes issuing from the regeneration, said fumes having a portion of its water content removed before recirculation to act as said purging gas in the regeneration.

References Cited in the file of this patent

UNITED STATES PATENTS

| | | |
|---|---|---|
| 2,357,365 | Van Horn et al. | Sept. 5, 1944 |
| 2,406,112 | Schulze | Aug. 20, 1946 |
| 2,606,878 | Haensel | Aug. 12, 1952 |
| 2,642,383 | Berger | June 16, 1953 |
| 2,642,384 | Cox | June 16, 1953 |
| 2,737,475 | Voorhies | Mar. 6, 1956 |
| 2,749,287 | Kirshenbaum | June 5, 1956 |
| 2,773,014 | Snuggs et al. | Dec. 4, 1956 |
| 2,791,542 | Nathan | May 7, 1957 |
| 2,792,337 | Engel | May 14, 1957 |
| 2,796,326 | Kimberlin et al. | June 18, 1957 |